(12) United States Patent
Zhou et al.

(10) Patent No.: US 11,399,314 B2
(45) Date of Patent: Jul. 26, 2022

(54) METHOD, APPARATUS AND SYSTEM FOR ACQUIRING CONTROL INFORMATION

(71) Applicant: Beijing Xiaomi Mobile Software Co., Ltd., Beijing (CN)

(72) Inventors: Juejia Zhou, Beijing (CN); Yajun Zhu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 271 days.

(21) Appl. No.: 16/634,030

(22) PCT Filed: Jul. 28, 2017

(86) PCT No.: PCT/CN2017/095040
§ 371 (c)(1),
(2) Date: Jan. 24, 2020

(87) PCT Pub. No.: WO2019/019187
PCT Pub. Date: Jan. 31, 2019

(65) Prior Publication Data
US 2021/0377812 A1    Dec. 2, 2021

(51) Int. Cl.
*H04W 28/26* (2009.01)
*H04W 72/00* (2009.01)
*H04W 72/04* (2009.01)

(52) U.S. Cl.
CPC ......... *H04W 28/26* (2013.01); *H04W 72/005* (2013.01); *H04W 72/042* (2013.01); *H04W 72/044* (2013.01)

(58) Field of Classification Search
CPC . H04W 28/26; H04W 72/005; H04W 72/042; H04W 72/044; H04W 28/0908;
(Continued)

(56) References Cited

U.S. PATENT DOCUMENTS

2011/0026475 A1  2/2011  Lee et al.
2015/0264689 A1  9/2015  Sampath et al.
(Continued)

FOREIGN PATENT DOCUMENTS

CN      106717054 A     5/2017
WO   WO 2010/050887 A1   5/2010
WO   WO 2015144850 A1   10/2015

OTHER PUBLICATIONS

First Office Action of Chinese Application No. 201780000707.4 dated Mar. 5, 2019.
(Continued)

*Primary Examiner* — Kiet Tang
(74) *Attorney, Agent, or Firm* — Finnegan, Henderson, Farabow, Garrett & Dunner, LLP (57) ABSTRACT

Embodiments of the present disclosure disclose a method, an apparatus and a system for acquiring control information, and belong to the field of communication technology. The method includes: receiving indication information sent by a base station, wherein the indication information is configured to indicate a standby bandwidth part (BWP) that is used when a BWP switching failure occurs, and the BWP indicated by the indication information is any of a BWP at Which a terminal works currently, a BWP at which the terminal works previously, and a preset BWP; switching to the BWP indicated by the indication information when detecting that the BWP switching failure occurs; and receiving control information corresponding to the terminal that is sent by the base station at the BWP indicated by the indication information. According to the present disclosure, the possibility of getting offline by the terminal may be reduced.

17 Claims, 5 Drawing Sheets

(58) Field of Classification Search
CPC ............. H04W 48/12; H04W 28/0231; H04W 72/0453; H04W 72/1289; H04W 72/0446; H04W 52/325; H04W 72/1263; H04L 5/001; H04L 5/0053
See application file for complete search history.

(56) References Cited

U.S. PATENT DOCUMENTS

| | | | |
|---|---|---|---|
| 2020/0213069 A1* | 7/2020 | Jiang | H04W 72/0446 |
| 2020/0221393 A1* | 7/2020 | Kim | H04W 52/325 |
| 2021/0211343 A1* | 7/2021 | Baldemair | H04W 72/1263 |

OTHER PUBLICATIONS

Second Office Action of Chinese Application No. 201780000707.4 dated Jul. 2, 2019.

International Search Report and Written Opinion of PCT Application No. PCT/CN2017/095040 dated Mar. 27, 2018.

Extended European Search Report of counterpart EP Application No. 17919560.7 dated Feb. 15, 2021.

Huawei et al; Bandwidth adaptation and scalable design in NR, 3GPP TSG RAN WG1 Meeting #88, R1-1701644, Athens, Greece, Feb. 13-17, 2017, 5 pages.

Huawei et al; On bandwidth part and bandwidth adaptation, 3GPP TSG RAN WG1 Meeting #89, R1-1706900, Hangzhou, China, May 15-19, 2017, 9 pages.

Interdigital et al; Bandwidth Adaptation via BWP Selection in NR, 3GPP TSG RAN WG1 NR Ad-Hoc #2, R1-1710878, Qingdao, China, Jun. 27-30, 2017, 3 pages.

Huawei et al; Mechanisms of bandwidth adaptation; 3GPP TSG RAN WG1 NR Ad-Hoc Meeting, R1-1700011, Spokane, USA, Jan. 16-20, 2017, 5 pages.

* cited by examiner

METHOD, APPARATUS AND SYSTEM FOR ACQUIRING CONTROL INFORMATION

CROSS REFERENCE TO RELATED APPLICATIONS

This application is a national phase application based on PCT/CN2017/095040, filed Jul. 28, 2017, the content of which is incorporated herein by reference.

TECHNICAL FIELD

The present disclosure relates to the field of communication technology, and more particularly to a method, an apparatus and a system for acquiring control information.

BACKGROUND

NR (New Radio) technology in 5G (Fifth-generation of Wireless Mobile Telecommunications Technology) is similar to LTE (Long Term Evolution) technology in 4G (Fourth-generation of Wireless Mobile Telecommunications Technology), and is also an air interface technology with a time-frequency structure, where time-frequency resources are used, the time dimension is divided into different OFDM (Orthogonal Frequency Division Multiplexing) symbols, and the frequency dimension is divided into different sub-carriers.

In 5G, the frequency deployed for the NR is mostly in a high-frequency range and may be deployed from 3.3G Hz to 24 GHz, and thus, the carrier frequency range of the NR in 5G may be much larger than the carrier range of the LTE in 4G. As such, for one UE (User Equipment) and from the perspective of radio frequency capability and power consumption, a frequency band of the NR in 5G is divided into a plurality of BWPs (Band Width Part), and the UE is configured to work at at least one BWP at the same time. There is one RORESET (Control Resource Set) present in each BWP correspondingly, and the RORESET is a set of all the control information in the BWP to which it belongs, including such as control information, reference signals, etc. In general, a base station sends the RORESET to the UE via preset time-frequency resources in the BWP, and the UE working at the BWP may acquire the control information corresponding to itself in the RORESET from the preset time-frequency resources.

Sometimes, when the UE has a service requirement, the base station sends a BWP switching instruction to the UE. For example, the UE needs to switch from a BWP with a small frequency range to a BWP with a large frequency range when the size of the data to be sent thereby is large, and the like. After receiving the BWP switching instruction sent by the base station, the UE parses the BWP switching instruction to obtain the BWP to be switched to, and switches from a current BWP at which it works to the BWP obtained through parsing. However, in a BWP switching process, there may be BWP switching failures. For example, the UE receives the BWP switching instruction sent by the base station, but due to an error occurring during the parsing of the BWP switching instruction, obtains a wrong BWP through parsing and switches to the wrong BWP, and the like. In this way, the UE may not obtain the control information belonging to itself from the control resource set corresponding to the post-switching BWP, and may neither be dispatched nor receive the data sent by the base station, leading to the UE getting offline.

SUMMARY

According to a first aspect of embodiments of the present disclosure, there is provided a method for acquiring control information, including:

receiving indication information sent by a base station, wherein the indication information is configured to indicate a BWP that is used when a BWP switching failure occurs, and the BWP indicated by the indication information is any of a BWP at which a terminal works currently, a BWP at which the terminal works previously, and a preset BWP;

switching to the BWP indicated by the indication information when detecting that the BWP switching failure occurs; and receiving control information corresponding to the terminal that is sent by the base station at the BWP indicated by the indication information.

According to a second aspect of embodiments of the present disclosure, there is provided a method for acquiring control information, comprising:

sending indication information to a terminal, wherein the indication information is configured to indicate a standby BWP that is used when the terminal has a BWP switching failure, and the BWP indicated by the indication information is any of a BWP at which the terminal works currently, a BWP at which the terminal works previously, and a preset BWP; and sending control information corresponding to the terminal to the terminal at the BWP indicated by the indication information.

According to a third aspect of embodiments of the present disclosure, there is provided a terminal, comprising:

a first receiving module configured to receive indication information sent by a base station, wherein the indication information is configured to indicate a BWP that is used when a BWP switching failure occurs, and the BWP indicated by the indication information is any of a BWP at which a terminal works currently, a BWP at which the terminal works previously, and a preset BWP;

a switching module configured to switch to the BWP indicated by the indication information when detecting that the BWP switching failure occurs; and a second receiving module configured to receive control information corresponding to the terminal that is sent by the base station at the BWP indicated by the indication information.

According to a fourth aspect of embodiments of the present disclosure, there is provided a base station, comprising:

a first sending module configured to send indication information to a terminal, wherein the indication information is configured to indicate a standby BWP that is used when the terminal has a BWP switching failure, and the BWP indicated by the indication information is any of a BWP at which the terminal works currently, a BWP at which the terminal works previously, and a preset BWP and a second sending module configured to send control information corresponding to the terminal to the terminal at the BWP indicated by the indication information.

According to a fifth aspect of embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for acquiring control information according to the first aspect.

According to a sixth aspect of embodiments of the present disclosure, there is provided a computer readable storage medium, which stores at least one instruction, at least one program, a code set, or an instruction set, wherein the at least one instruction, the at least one program, the code set or the instruction set is loaded and executed by a processor to implement the method for acquiring control information according to the second aspect.

According to a seventh aspect of embodiments of the present disclosure, there is provided a terminal, comprising a processor and a memory, wherein the memory stores at least one instruction, at least one program, a code set, or an instruction set, wherein the at least one instruction, the at least one program, the code set or the instruction set is loaded and executed by the processor to implement the method for acquiring control information according to the first aspect.

According to an eighth aspect of embodiments of the present disclosure, there is provided a base station, including a processor and a memory, wherein the memory stores at least one instruction, at least one program, a code set, or an instruction set, wherein the at least one instruction, the at least one program, the code set or the instruction set is loaded and executed by the processor to implement the method for acquiring control information according to the second aspect.

According to a ninth aspect of embodiments of the present disclosure, there is provided a system for acquiring control information, including a terminal, such as the terminal described in the third aspect, and a base station, such as the base station described in the fourth aspect.

The technical solutions provided by the embodiments of the present disclosure may include the following beneficial effects.

In the embodiments of the present disclosure, a terminal receives indication information sent by a base station, wherein the indication information is configured to indicate a standby BWP that is used when a BWP switching failure occurs, and the BWP indicated by the indication information is any of a BWP at which a terminal works currently, a BWP at which the terminal works previously, and a preset BWP; the BWP indicated by the indication information is switched to when the BWP switching is detected to have failed; and control information corresponding to the terminal that is sent by the base station at the BWP indicated by the indication information is received. In this way, when the BWP switching failure occurs, the terminal may acquire control information corresponding to itself from the BWP indicated by the base station, leading to low possibility of getting offline by the terminal.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may also derive other drawings from these accompanying drawings without creative efforts.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

Figure 1:
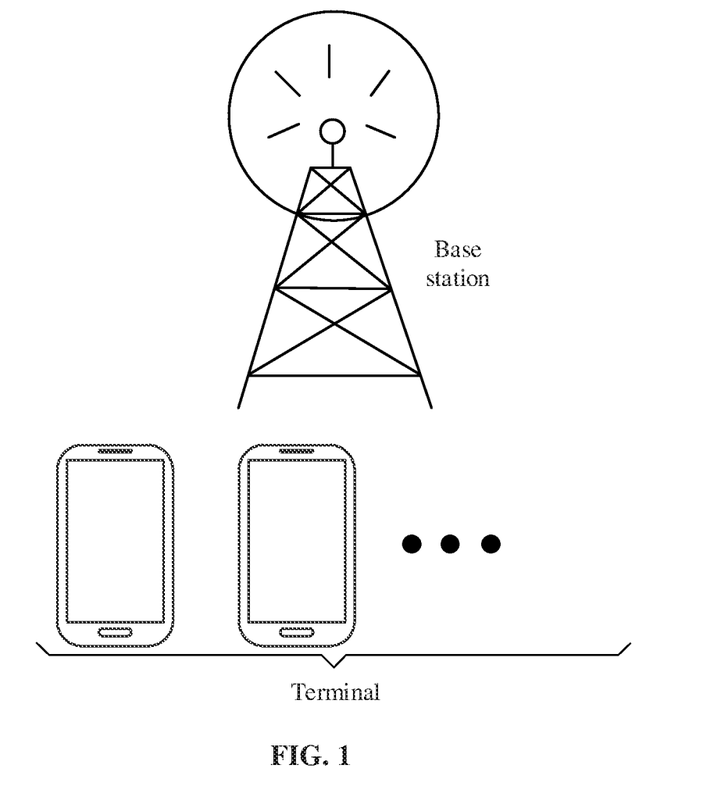
FIG. 1 is a schematic diagram of a system for acquiring control information according to an embodiment of the present disclosure.

An exemplary embodiment of the present disclosure provides a method for acquiring control information, As shown in FIG. 1, the method for acquiring control information may be implemented by a base station and a terminal jointly.

The terminal may be a mobile phone, a tablet computer and other devices capable of using the mobile communication network, and the terminal may be provided with a processor, a memory, a transceiver, etc.; the processor may be configured to handle a process of acquiring control information; the memory may be configured to store data required and data produced in the process of acquiring control information; the transceiver may be configured to receive and send messages; and the terminal may be further provided with an input/output device such as a screen, which may be configured to display signal quality and the like and may be a touch screen.

The base station may be provided with a processor, a transceiver, a memory, etc.; the processor may be configured for relevant handling in the process of acquiring control information; the transceiver may be configured to receive and send data; and the memory may be configured to store data required and data produced in the process of acquiring control information.

Figure 2:
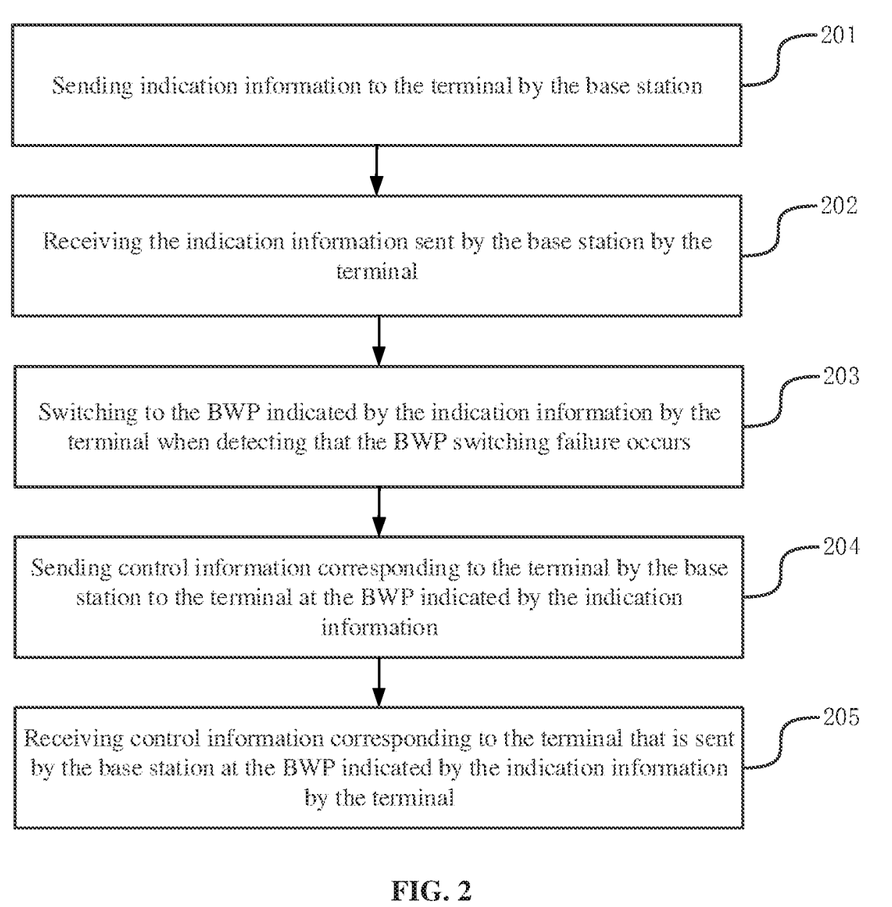
FIG. 2 is a flowchart of a method for acquiring control information according to an embodiment of the present disclosure.

As shown in FIG. 2, a process flow of the method may include the following steps.

In step 201, the base station sends indication information to the terminal.

In the embodiment, the indication information is configured to indicate a standby BWP that is used when the terminal has a BWP switching failure, that is, the standby BWP is a BWP to which the terminal switches when the BWP switching failure occurs. The BWP indicated by the indication information is any of a BWP at which a terminal works currently, a BWP at which the terminal works previously, and a preset BWP. In general, the terminal may work at multiple BWPs at the same time. The BWP at which the terminal works currently refers to multiple MVPs at which the terminal works currently at the same time; the BWP at which the terminal works previously refers to a BWP at which the terminal works before the current time point; and the preset BWP may be any of all the BWPs.

In implementation, after each terminal starts up and accesses the network, the base station may send the indication information to the terminal via the broadcast signaling, the upper-layer signaling, or the physical-layer instruction, and the upper-layer signaling may be a signaling based on RRC (Radio Resource Control), or a signaling sent via MAC (Media Access Control), In an embodiment of the present disclosure, a terminal is described in detail, and the processes of other terminals are the same. If the standby BWP is the preset BWP when the terminal has a BWP switching failure, the indication information may be information that carries an identifier of the preset BWP, such as a frequency range of the preset BWP. If the standby BWP is the BWP at which the terminal works currently ("currently" here refers to the time when the switching failure occurs) or previously when the terminal has a BWP switching failure, the indication information may indicate how to select the BWP to be switched to, such as the indication information being the information notifying to select the BWP with the broadest frequency band among the BWPs at which the terminal works currently when the BWP switching failure occurs, or being the information notifying to select the BWP closest to the current time point among the BWPs at which the terminal works previously when the BWP switching failure occurs, or the like.

In step 202, the terminal receives the indication information sent by the base station.

In implementation, the terminal may receive the indication information sent by the base station, and store the indication information.

In step 203, the terminal switches to the BWP indicated by the indication information When detecting that the BWP switching failure occurs.

Figure 3:
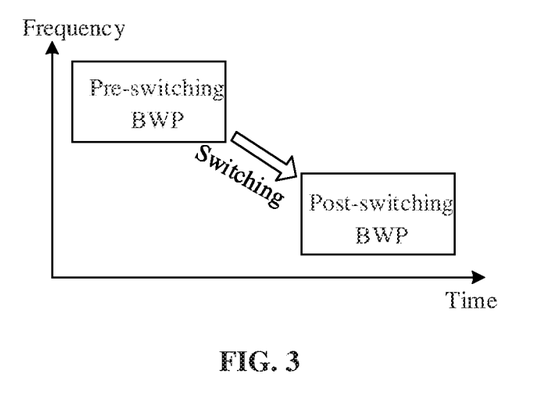
FIG. 3 is a schematic diagram of BWP switching according to an embodiment of the present disclosure.

In implementation, as shown in FIG. 3, if the terminal has not detected the control information of its own when it reaches the condition for acquiring the control information (this process will be described later in detail), it is determined that the BWP switching failure occurs, When detecting that the BWP switching failure occurs, the terminal acquires the stored indication information, parses the indication information to obtain the BWP indicated by the indication information. and then switches to the BWP indicated by the indication information.

Optionally, there are two cases where the BWP switching is determined to be failed, which are described below in detail.

In the first case, the BWP indicated by the indication information is switched to when a duration since last successful demodulation to the control information corresponding to the terminal reaches a first duration.

In the embodiment, the first duration is a preset value, or a value computed based on a first reference duration, a BWP parameter corresponding to a pre-switching BWP, and a preset computing method. The preset value may also be preset by a technician and stored in the terminal, or received from the base station. The first reference duration may also be preset by a technician and stored in the terminal, or received from the base station. The BWP parameter includes a sub-carrier spacing of the pre-switching BWP, a bandwidth of the pre-switching BWP, and the like. The preset computing method may also be preset by the technician and stored in the terminal, or received from the base station. For example, the preset computing method may be $t1=T/(BWP\ parameter/15(KHz))$, with t1 being the first duration, T being the first reference duration, and the BWP parameter being the sub-carrier spacing of the pre-switching BWP; and the preset computing method may also be $t1=T*(BWP\ parameter/5(MHz))$, with t1 being the first duration, T being the first reference duration, and the BWP parameter being the bandwidth of the pre-switching BWP.

In implementation, in general, the base station periodically sends the control information corresponding to the terminal in the BWP at which the terminal works currently sometimes when determining that the terminal needs to perform the BWP switching, the base station may send a BWP switching instruction to the terminal; when the terminal does not receive the BWP switching instruction but the base station considers that the terminal has switched to the BWP indicated by the BWP switching instruction, the base station sends the control information corresponding to the terminal in the post-switching BWP, rather than in pre-switching BWP; in this way, the terminal may detect that the duration since last successful demodulation to the control information corresponding to itself reaches the first duration, and the terminal may acquire the stored indication information, parse the indication information to obtain the BWP indicated by the indication information, and then switch to the BWP indicated by the indication information.

It should be noted that each time when the control information corresponding to the terminal is successfully demodulated from the BWP, the terminal re-times from zero to determine whether the duration since the last successful demodulation to the control information corresponding to the terminal reaches the first duration.

Optionally, the terminal receives configuration information of the first duration that is sent by the base station via a broadcast signaling, an upper-layer signaling, or a physical-layer signaling.

In the embodiment, the configuration information includes a first reference duration and a preset computing method. The first reference duration, such as 1 ms, may be preset by a technician and stored in the base station. The preset computing method may also be preset by the technician, and stored in the base station.

In implementation, after the terminal starts up and accesses the network, the base station may send the configuration information of the first duration to the terminal via the broadcast signaling, the upper-layer signaling, or the physical-layer instruction, and the upper-layer signaling may be a signaling based on RRC (Radio Resource Control), or a signaling sent via the MAC (Media Access Control), After receiving the configuration information sent by the base station, the terminal may store the configuration information of the first duration.

In addition, the configuration information may further include a BWP parameter of the pre-switching BWP, such as a bandwidth of the pre-switching BWP, a sub-carrier spacing of the pre-switching BWP, etc.

Optionally, the first duration is expressed by a length of time, a number of unit time-domain resources, or a number of code block groups.

In implementation, the first duration may be expressed by a length of time, such as 5 ms and the like as the first duration.

The first duration may also be expressed by a number of unit time-domain resources. For example, the unit time-domain resource may be a symbol, a time slot, a sub-frame, etc.; the first duration may be a time slot., i.e. 0.5 ms, and the first duration is a sub-frame, i.e. 1 ms.

The first duration may also be expressed by a number of code clock groups. In general, one TTI may contain multiple code block groups, and the duration of each TTI is 1 ms, and thus, the number of code block groups may be used for timing. For example, if one TTI includes 5 code block groups, each of which has a duration of 0.2 ms, and the number of the code block groups is 3, then the first duration is 0.6 ms.

In a second case, when the control information corresponding to the terminal is not acquired from a post-switching BWP within a second duration after receiving a BWP switching instruction sent by the base station, the BWP indicated by the indication information is switched to.

In the embodiment, the second duration is a preset value, or a value computed based on a second reference duration, a BWP parameter corresponding to a post-switching BWP, and a preset computing method. A preset value may be preset by the technician and stored in the terminal, or received from the base station. The second reference duration may also be preset by the technician and stored in the terminal, or received from the base station. The BWP parameter includes a sub-carrier spacing, a BWP bandwidth, etc. The preset. computing method may also be preset by the technician and stored in the terminal, or received from the base station, For example, the preset computing method may be t1=T/(BWP parameter/15(KHz)), with t1 being the second duration, T being the second reference duration, and the BWP parameter being the sub-carrier spacing of the post-switching BWP; and the preset computing method may also be t1=T*(BWP parameter/5(MHz)), with t1 being the second duration, T being the second reference duration, and the BWP parameter being the bandwidth of the post-switching BWP, wherein the post-switching BWP here is the BWP indicated by the BWP switching instruction.

In implementation, in general, the base station periodically sends the control information corresponding to the terminal in the BWP at which the terminal works currently when determining that the terminal needs to perform the BWP switching, the base station may send a BWP switching instruction to the terminal; and after receiving the BWP switching instruction, the terminal first parses the BWP switching instruction to obtain the BWP indicated by the BWP switching instruction, and then, switches to the BWP indicated by the BWP switching instruction. Sometimes, the terminal may obtain a wrong BWP after parsing the BWP switching instruction, and thus may switch to the wrong BWP, and the terminal in turn may not acquire the control information corresponding to the terminal from the post-switching BWP within the second duration after receiving the BWP switching instruction sent by the base station. The terminal may acquire the stored indication information, parses the indication information to obtain the BWP indicated by the indication information, and then switches to the BWP indicated by the indication information.

Optionally, the terminal may receive the BWP switching instruction sent by the base station by means of a variety of instructions, and a corresponding process may be as follows:

switching to the BWP indicated by the indication information when the control information corresponding to the terminal is not acquired from the post-switching BWP within the second duration after receiving a BWP switching instruction sent by the base station via a broadcast signaling, an upper-laver signaling, or a physical-laver signaling.

In implementation, when determining that the terminal needs to perform BWP switching, the base station may send a BWP switching instruction to the terminal via a broadcast signaling, an upper layer signaling, or a physical layer signaling, where the upper-layer signaling may be a signaling based on RRC or a signaling sent via MAC. The subsequent processes have been described above, and will not be repeated here.

Optionally, configuration information of the second duration that is sent by the base station is received via a broadcast signaling, an upper-layer signaling, or a physical-layer signaling.

In the embodiment, the configuration information includes a second reference duration and a preset computing method. The second reference duration such as 2 ms may be preset by a technician and stored in the base station. The preset computing method may also be preset by the technician, and stored to the base station.

In implementation, after the terminal starts up and accesses the network, the base station may send the configuration information of the second duration to the terminal via the broadcast signaling, the upper-layer signaling, or the physical-layer instruction, and the upper-layer signaling may be a signaling based on RRC (Radio Resource Control), or a signaling sent via the MAC (Media Access Control). After receiving the configuration information sent by the base station, the terminal may store the configuration information of the second duration.

Optionally, the second duration is expressed by a length of time, a number of unit time-domain resources, or a number of code block groups.

In implementation, the second duration may be expressed by a length of time, such as 5 ms and the like as the second duration.

The second duration may also be expressed by a number of unit time-domain resources. For example, the unit time-domain resource may be a symbol, a time slot, a sub-frame, etc.; the second duration may be a time slot, i.e., 0.5 ms; and the second duration is a sub-frame, i.e., 1 ms.

The second duration may also be expressed by a number of code clock groups. In general, one TTI may contain multiple code block groups, and the duration of each TTI is 1 ms, and thus, the number of code block groups may be used for timing. For example, if one TTI includes 5 code block groups, each of which has a duration of 0.2 ms, and the number of the code block groups is three, then the second duration is 0.6 ms.

It should be noted that since the first duration and the second duration represent different meanings, the first duration and the second duration are generally different.

In step 204, the base station sends control information corresponding to the terminal to the terminal at the BWP indicated by the indication information.

In implementation, when the BWP indicated by the indication information is a preset BWP, a pre-switching BWP, or a post-switching BWP, the base station may send the corresponding control information to the terminal at the BWP indicated by the indication information when determining that the terminal has a BWP switching failure (the process will be described later in detail).

In addition, when the BWP indicated by the indication information is a preset BWP, the base station may send the control information corresponding to the terminal in the preset BWP in each cycle. In this way, it is unnecessary for the base station to determine Whether the terminal has a BWP switching failure.

Optionally, when the switching success notification is not received, the control information corresponding to the terminal may be sent to the terminal, and the corresponding step 204 may include the following process:

sending control information corresponding to the terminal to the terminal at the BWP indicated by the indication information when a BWP switching success notification sent by the terminal is not received within a third duration after a BWP switching instruction is sent to the terminal.

In the embodiment, the third duration may be preset by the technician and stored in the base station, or may be computed from the first duration or the second duration, such as by adding an offset to the first duration or the second duration to obtain the third duration, where the offset here represents the sum of a transmission duration and a parsing duration of the BWP switching instruction.

In implementation, when determining that the terminal needs to perform the BWP switching, the base station may send a BWP switching instruction to the terminal: the timing starts after the BWP switching instruction is sent; when the duration reaches the third duration and the BWP switching success notification sent by the terminal has not been received, the base station determines that the terminal has a BWP switching failure. The base station may send corresponding control information to the terminal periodically at the BWP indicated by the indication information.

Optionally, the third duration may also be expressed by a length of time, a number of unit time-domain resources, or a number of code block groups.

Optionally, when the terminal may not switch to the BWP indicated by the indication information all along due to its own reasons (such as a fault), the base station may stop sending the corresponding control information to the terminal, and a corresponding process may be as follows:

stopping sending the control information corresponding to the terminal to the terminal at the BWP indicated by the indication information when a BWP switching failure notification sent by the terminal is not received within a fourth duration after the control information corresponding to the terminal is sent to the terminal at the BWP indicated by the indication information.

In the embodiment, the fourth duration may be preset by a technician and stored in the base station.

In implementation, after the base station sends the corresponding control information to the terminal for the first time at the BWP indicated by the indication information, the base station may start timing; when the duration reaches the fourth duration and the BWP switching failure notification sent by the terminal has not been received, the base station does not send the control information corresponding to the terminal to the terminal at the BWP indicated by the indication information, thereby saving transmission resources.

Optionally, the fourth duration may also be expressed by a length of time, a number of unit time-domain resources, or a number of code block groups.

In step 205, the terminal receives control information corresponding to the terminal that is sent by the base station at the BWP indicated by the indication information.

In implementation, after switching to the BWP indicated by the indication information, the terminal may obtain the control information of its own by demodulating the BWP, so that the terminal may not get offline.

Optionally, after the terminal switches to the BWP indicated by the indication information, the terminal may further notify the base station that its BWP switching fails, and a corresponding process may be as follows:

sending a BWP switching failure notification to the base station.

In implementation, after switching to the BWP indicated by the indication information, the terminal may obtain the control information of its own by demodulation, and then may send a BWP switching failure notification to the base station. After receiving the BWP switching failure notification sent by the terminal, the base station may send a BWP switching instruction to the terminal, with an identifier of the BWP to be switched to carried therein. After receiving the BWP switching instruction sent by the base station, the terminal may perform the BWP switching again.

In the embodiments of the present disclosure, a terminal receives indication information sent by a base station, wherein the indication information is configured to indicate a standby BWP that is used when a BWP switching failure occurs, and the BWP indicated by the indication information is any of a BWP at which a terminal works currently, a BWP at which the terminal works previously, and a preset BWP; the BWP indicated by the indication information is switched to when the BWP switching is detected to have failed and control information corresponding to the terminal that is sent by the base station at the BWP indicated by the indication information is received. In this way, when the BWP switching failure occurs, the terminal may acquire control information corresponding to itself from the BWP indicated by the base station, leading to low possibility of getting offline by the terminal.

Figure 4:
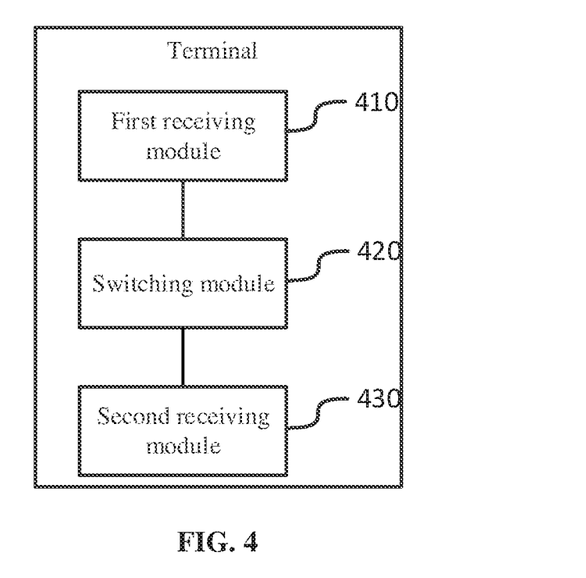
FIG. 4 is a schematic structural diagram of a terminal according to an embodiment of the present disclosure.

Based on the same technical idea, another exemplary embodiment of the present disclosure further provides a terminal, as shown in FIG. 4, which includes:

a first receiving module 410 configured to receive indication information sent by a base station, wherein the indication information is configured to indicate a BWP that is used when a BWP switching failure occurs, and the BWP indicated by the indication information is any of a BWP at which a terminal works currently, a BWP at which the terminal works previously, and a preset BWP;

a switching module 420 configured to switch to the BWP indicated by the indication information when detecting that the BWP switching failure occurs; and a second receiving module 430 configured to receive control information corresponding to the terminal that is sent by the base station at the BWP indicated by the indication information.

Optionally, the switching module 420 is configured to:

switch to the BWP indicated by the indication information when a duration since last successful demodulation to the control information corresponding to the terminal reaches a first duration, wherein the first duration is a preset value, or a value computed based on a first reference duration, a BWP parameter corresponding to a pre-switching BWP, and a preset computing terminal.

Optionally, the first receiving module 410 is further configured to:

receive configuration information of the first duration that is sent by the base station via a broadcast signaling, an upper-layer signaling, or a physical-layer signaling, wherein the configuration information includes the first reference duration and the preset computing terminal.

Optionally, the first duration is expressed by a length of time, a number of unit time-domain resources, or a number of code block groups.

Optionally, the switching module 410 is configured to:

switch to the BWP indicated by the indication information When the control information corresponding to the terminal is not acquired from the post-switching BWP within a second duration after the BWP switching instruction sent by the base station is received, wherein the second duration is a preset value, or a value computed based on a second reference duration, a BWP parameter corresponding to a post-switching BWP, and a preset computing terminal.

Optionally, the first receiving module 410 is further configured to:

receive configuration information of the second duration that is sent by the base station via a broadcast signaling, an upper-layer signaling, or a physical-layer signaling, wherein the configuration information includes the second reference duration and the computing terminal of the second duration.

Optionally, the second duration is expressed by a length of time, a number of unit time-domain resources, or a number of code block groups.

Optionally, the switching module 420 is configured to:

switch to the BWP indicated by the indication information When the control information corresponding to the terminal is not acquired from the post-switching BWP within the second duration after receiving a BWP switching instruction sent by the base station via a broadcast signaling, an upper-layer signaling, or a physical-layer signaling.

Figure 5:
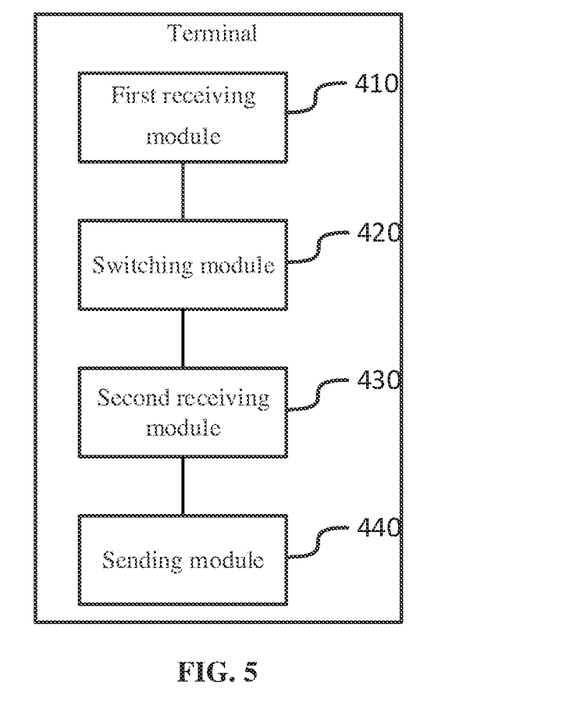
FIG. 5 is a schematic structural diagram of a terminal according to another embodiment of the present disclosure.

Optionally, as shown in FIG. 5, the terminal further includes:

a sending module 440 configured to send a BWP switching failure notification to the base station.

In the embodiments of the present disclosure, a terminal receives indication information sent by a base station, wherein the indication information is configured to indicate a standby BWP that is used when a BWP switching failure occurs, and the BWP indicated by the indication information is any of a BWP at which a terminal works currently, a BWP which the terminal works previously, and a preset BWP; the BWP indicated by the indication information is switched to when the BWP switching is detected to have failed; and control information corresponding to the terminal that is sent by the base station at the BWP indicated by the indication information is received. In this way, when the BWP switching failure occurs, the terminal may acquire control information corresponding to itself from the BWP indicated by the base station, leading to low possibility of getting offline by the terminal.

It should be noted that the terminal provided by the present embodiment only takes division of all the functional modules as an example for explanation during acquiring of the control information. In practice, the above functions can be finished by the different functional modules as required. That is, the internal structure of the terminal is divided into different functional modules to finish all or part of the functions described above. In addition, the terminal provided by the present embodiment has the same concept as the method for acquiring control information provided by the foregoing embodiment. Refer to the method embodiment for the specific implementation process of the terminal, which will not be repeated herein.

Figure 6:
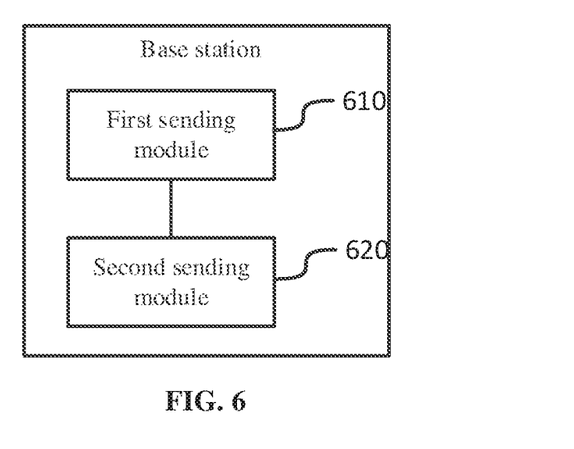
FIG. 6 is a schematic structural diagram of a base station according to an embodiment of the present disclosure.

Based on the same technical idea, another exemplary embodiment of the present disclosure further provides a base station, as shown in FIG. 6, which includes:

a first sending module 610 configured to send indication information to a terminal, wherein the indication information is configured to indicate a standby BWP that is used when the terminal has a BWP switching failure, and the BWP indicated by the indication information is any of a BWP at which the terminal works currently, a BWP at which the terminal works previously, and a preset BWP; and a second sending module 620 configured to send control information corresponding to the terminal to the terminal at the BWP indicated by the indication information, Optionally, the second sending module 620 is configured to:

send control information corresponding to the terminal to the terminal at the BWP indicated by the indication information. when a BWP switching success notification sent by the terminal is not received within a third duration after a BWP switching instruction is sent to the terminal, Optionally, the second sending module 620 is further configured to:

stop sending the control information corresponding to the terminal to the terminal at the BWP indicated by the indication information when a BWP switching failure notification sent by the terminal is not received within a fourth duration after the control information corresponding to the terminal is sent to the terminal at the BWP indicated by the indication information.

In the embodiments of the present disclosure, a terminal receives indication information sent by a base station, wherein the indication information is configured to indicate a standby BWP that is used when a BWP switching failure occurs, and the BWP indicated by the indication information is any of a BWP at which a terminal works currently, a BWP at which the terminal works previously, and a preset BWP; the BWP indicated by the indication information is switched to when the BWP switching is detected to have failed; and control information corresponding to the terminal that is sent by the base station at the BWP indicated by the indication information is received, In this way, when the BWP switching failure occurs, the terminal may acquire control information corresponding to itself from the BWP indicated by the base station, leading to low possibility of getting offline by the terminal.

It should be noted that the base station provided by the present embodiment only takes division of all the functional modules as an example for explanation during acquiring of the control information. In practice, the above functions can be finished by the different functional modules as required. That is, the internal structure of the base station is divided into different functional modules to finish all or part of the functions described above. in addition, the base station provided by the present embodiment has the same concept as the method for acquiring control information provided by the foregoing embodiment. Refer to the method embodiment for the specific implementation process of the base station, which will not be repeated herein.

Figure 7:
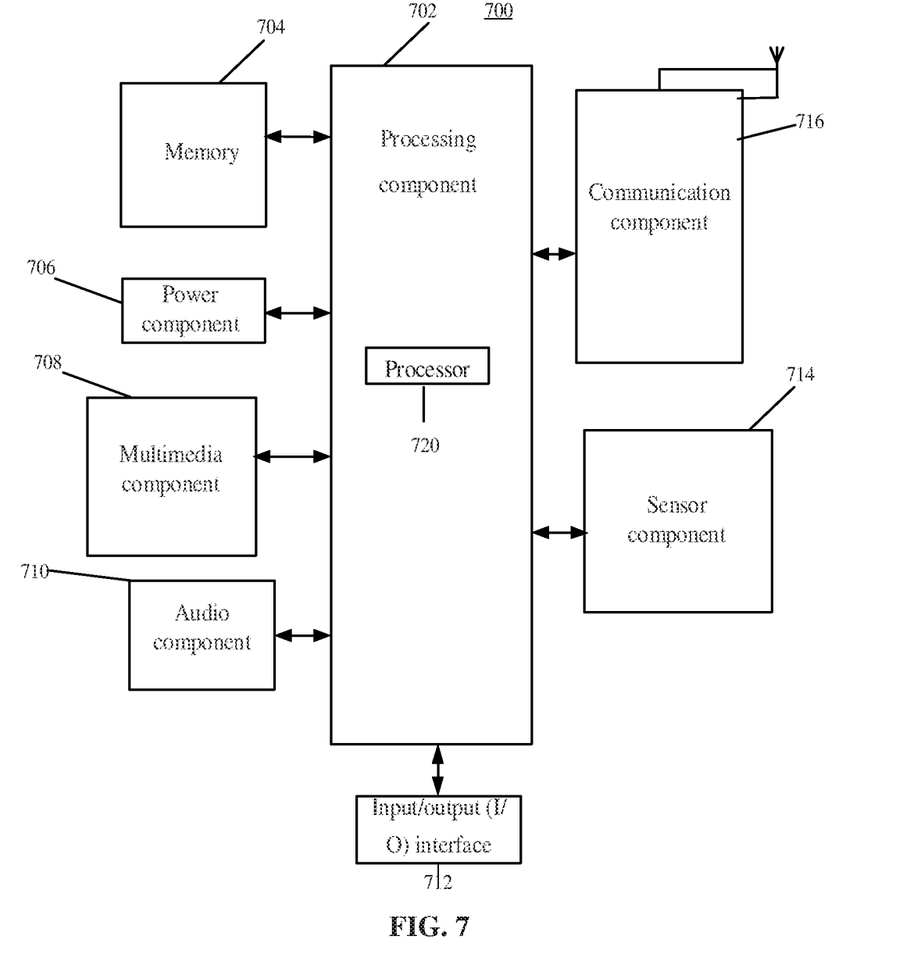
FIG. 7 is a schematic structural diagram of a terminal according to another embodiment of the present disclosure.

A further exemplary embodiment of the present disclosure provides a schematic structural diagram of a terminal. The terminal may be a mobile phone and the like.

Referring to FIG. 7, the terminal 700 may include one or more of the following components: a processing component 702, a memory 704, a power component 706, a multimedia component 708, an audio component 710, an input/output (I/O) interface 712, a sensor component 714, and a communication component 716.

The processing component 702 typically controls the overall operations of the terminal 700, such as the operations associated with display, telephone calls, data communications, camera operations, and recording operations. Thee processing component 702 may include one or more processors 720 to execute instructions to perform all or part of the steps in the above described methods. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the terminal 700. Examples of such data include instructions for any applications or methods operated on the terminal 700, contact data, phonebook data, messages, pictures, videos, etc. The memory 704 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 706 provides power to various components of the terminal 700. The power component 706 may include a power management system. one or more power sources, and any other components associated with the generation, management, and distribution of power in the terminal 700.

The multimedia component 708 includes a screen providing an output interface between the terminal 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense the duration and pressure associated with the touch or swipe action. In some embodiments, the multimedia component 708 includes a front camera and/or a rear camera. The front camera and the rear camera may receive external multimedia data while the terminal 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone (MIC) configured to receive external audio signals when the terminal 700 is in an operation mode, such as a call mode, a recording mode. and a voice recognition mode. The received audio signal may be further stored in the memory 704 or transmitted via the communication component 716. In some embodiments, the audio component 710 further includes a speaker for outputting audio signals.

The I/O interface 712 provides an interface between the processing component 702 and peripheral interface modules, such as a keyboard, a click wheel, buttons, and the like. The buttons may include, but are not limited to, a home button, a volume button, a start button, and a lock button.

The sensor component 714 includes one or more sensors to provide status assessments of various aspects of the terminal 700. For instance, the sensor component 714 may detect an on/off status of the terminal 700, relative positioning of components, e.g., the display device and the mini keyboard of the terminal 700, and the sensor component 714 may also detect a position change of the terminal 700 or a component of the terminal 700, presence or absence of user contact with the terminal 700 orientation or acceleration/deceleration of the terminal 700, and temperature change of the terminal 700. The sensor component 714 may include a proximity sensor configured to detect the presence of nearby objects without any physical contact. The sensor component 714 may also include a light sensor, such as a CMOS or CCD image sensor, used for imaging applications. In some embodiments, the sensor component 714 may also include, an accelerometer sensor, a gyroscope sensor, a magnetic sensor, a pressure sensor, or a temperature sensor.

The communication component 716 is configured to facilitate communication, wired or wirelessly, between the terminal 700 and other devices. The terminal 700 can access a wireless network based on a communication standard, such as WiFi, 2G, or 3G, or a combination thereof. In an exemplary embodiment, the communication component 716 receives broadcast signals or broadcast associated information from an external broadcast management system via a broadcast channel, In an exemplary embodiment, the communication component 716 further includes a near field communication (NFC) module to facilitate short-range communications. For example, the NFC module may be implemented based on a radio frequency identification (RFD) technology, an infrared data association (IrDA) technology, an ultra-wideband (UWB) technology, a Bluetooth (BT) technology, and other technologies.

In exemplary embodiments, the terminal 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, a non-transitory computer-readable storage medium including instructions is also provided, such as the memory 704 including instructions, executable by the processor 720 in the terminal 700, for performing the above-described methods, For example, the non-transitory computer-readable storage medium may be a ROM, a RAM, a CD-ROM, a magnetic tape, a floppy disc, an optical data storage device, and the like.

There is provided a non-transitory computer readable storage medium. When instructions in the storage medium are executed by a processor of a terminal, the terminal is enabled to execute the method described above, which includes:

receiving indication information sent by a base station, wherein the indication information is configured to indicate a BWP that is used when a BWP switching failure occurs, and the BWP indicated by the indication information is any of a BWP at which a terminal works currently, a BWP at which the terminal works previously, and a preset IMP;

switching to the BWP indicated by the indication information when detecting that the BWP switching failure occurs; and receiving control information corresponding to the terminal that is sent by the base station at the BWP indicated by the indication information.

Optionally, the switching to the BWP indicated by the indication information when detecting that the BWP switching failure occurs includes:

switching to the BWP indicated by the indication information when a duration since last successful demodulation to the control information corresponding to the terminal reaches a first duration, wherein the first duration is a preset value, or a value computed based on a first reference duration, a BWP parameter corresponding to a pre-switching BWP, and a preset computing method.

Optionally, the method further includes:

receiving configuration information of the first duration that is sent by the base station via a broadcast signaling, an upper-layer signaling, or a physical-layer signaling, wherein the configuration information includes the first reference duration and the preset computing method.

Optionally, the first duration is expressed by a length of time, a number of unit time-domain resources, or a number of code block groups.

Optionally, the switching to the BWP indicated by the indication information when detecting that the BWP switching failure occurs includes:

switching to the BWP indicated by the indication information when the control information corresponding to the terminal is not acquired from the post-switching BWP within a second duration after the BWP switching instruction sent by the base station is received, wherein the second duration is a preset value, or a value computed based on a second reference duration, a BWP parameter corresponding to a post-switching BWP, and a preset computing method.

Optionally, the method further includes:

receiving configuration information of the second duration that is sent by be base station via a broadcast signaling, an upper-layer signaling, or a physical-layer signaling, wherein the configuration information includes the second reference duration and the computing method of the second duration.

Optionally, the second duration is expressed by a length of time, a number of unit time-domain resources, or a number of code block groups.

Optionally, the switching to the BWP indicated by the indication information when the control information corresponding to the terminal is not acquired from a post-switching BWP within a second duration after receiving a BWP switching instruction sent by the base station includes:

switching to the BWP indicated by the indication information when the control information corresponding to the terminal is not acquired from the post-switching BWP within the second duration after receiving a BWP switching instruction sent by the base station via a broadcast signaling, an upper-layer signaling, or a physical-layer signaling.

Optionally, the receiving control information corresponding to the terminal that is sent by the base station at the BWP indicated by the indication information further includes:

sending a BWP switching failure notification to the base station.

In the embodiments of the present disclosure, a terminal receives indication information sent by a base station, wherein the indication information is configured to indicate a standby BWP that is used when a BWP switching failure occurs, and the BWP indicated by the indication information is any of a BWP at which a terminal works currently, a BWP at which the terminal works previously, and a preset BWP; the BWP indicated by the indication information is switched to when the BWP switching is detected to have failed; and control information corresponding to the terminal that is sent by the base station at the BWP indicated by the indication information is received. In this way, when the BWP switching failure occurs, the terminal may acquire control information corresponding to itself from the BWP indicated by the base station, leading to low possibility of getting offline by the terminal.

Persons of ordinary skills in the art may understand that all or some of the steps described in the embodiments above can be completed through hardware, or through relevant hardware instructed by a program stored in a non-transitory computer readable storage medium, and the storage medium mentioned above may be a read-only memory, a disk or a CD, or the like.

The foregoing descriptions are merely preferred embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A method for acquiring control information, the method being performed by a terminal and comprising:

receiving indication information sent by a base station, wherein the indication information is configured to indicate a standby bandwidth part (BWP) to be used when a BWP switching failure occurs, and the BWP indicated by the indication information is any of a BWP at which the terminal works currently, a BWP at which the terminal works previously, and a preset BWP;

switching to the BWP indicated by the indication information when detecting that the BWP switching failure occurs;

receiving control information corresponding to the terminal, the control information being sent by the base station at the BWP indicated by the indication information; and sending a BWP switching failure notification to the base station.

2. The method according to claim 1, wherein the switching to the BWP indicated by the indication information when detecting that the BWP switching failure occurs comprises:

switching to the BWP indicated by the indication information when a duration since last successful demodulation to the control information corresponding to the terminal reaches a first duration.

3. The method according to claim 2, wherein the first duration is one of a preset value, or a value computed based on a first reference duration, a BWP parameter corresponding to a pre-switching BWP, and a preset computing method.

4. The method according to claim 3, further comprising:

receiving configuration information of the first duration, the configuration information being sent by the base station via at least one of a broadcast signaling, an upper-layer signaling, or a physical-layer signaling, wherein the configuration information comprises the first reference duration and the preset computing method.

5. The method according to claim 2, wherein the first duration is expressed by at least one of a length of time, a number of unit time-domain resources, or a number of code block groups.

6. The method according to claim 1, wherein the switching to the BWP indicated by the indication information when detecting that the BWP switching failure occurs comprises:

switching to the BWP indicated by the indication information when the control information corresponding to the terminal is not acquired from a post-switching BWP within a second duration after receiving a BWP switching instruction sent by the base station.

7. The method according to claim 6, wherein the second duration is one of a preset value, or a value computed based on a second reference duration, a BWP parameter corresponding to the post-switching BWP, and a preset computing method.

8. The method according to claim 7, further comprising:

receiving configuration information of the second duration, the configuration information being sent by the base station via at least one of a broadcast signaling, an upper-layer signaling, or a physical-layer signaling, wherein the configuration information comprises the second reference duration and the computing method of the second duration.

9. The method according to claim 6, wherein the second duration is expressed by one of a length of time, a number of unit time-domain resources, or a number of code block groups.

10. The method according to claim 6, wherein the switching to the BWP indicated by the indication information when the control information corresponding to the terminal is not acquired from a post-switching BWP within a second duration after receiving a BWP switching instruction sent by the base station comprises:

switching to the BWP indicated by the indication information when the control information corresponding to the terminal is not acquired from the post-switching BWP within the second duration after receiving a BWP switching instruction sent by the base station via at least one of a broadcast signaling, an upper-layer signaling, or a physical-layer signaling.

11. A method for acquiring control information, the method being performed by a base station and comprising:

sending indication information to a terminal, wherein the indication information is configured to indicate a standby bandwidth part (BWP) to be used when the terminal has a BWP switching failure, and the BWP indicated by the indication information is any of a BWP at which the terminal works currently, a BWP at which the tern I works previously, and a preset BWP;

sending, to the terminal, control information corresponding to the terminal at the BWP indicated by the indication information; and receiving a BWP switching failure notification sent by the terminal.

12. The method according to claim 11, wherein the sending, to the terminal, control information corresponding to the terminal at the BWP indicated by the indication information comprises:

sending, to the terminal, control information corresponding to the terminal at the BWP indicated by the indication information when a BWP switching success notification sent by the terminal is not received within a third duration after a BWP switching instruction is sent to the terminal.

13. The method according to claim 12, wherein after the sending, to the terminal, control information corresponding to the terminal at the BWP indicated by the indication information, the method further comprises:

stopping sending, to the terminal, the control information corresponding to the terminal at the BWP indicated by the indication information when the BWP switching failure notification sent by the terminal is not received within a fourth duration after the control information corresponding to the terminal is sent to the terminal at the BWP indicated by the indication information.

14. A non-transitory computer readable storage medium having stored thereon instructions that, when executed by a processor a terminal, cause the terminal to implement the method for acquiring control information according to claim 1.

15. A non-transitory computer readable storage medium having stored thereon instructions that, when executed by a processor of a base station, cause the base station to implement the method for acquiring control information according to claim 11.

16. A terminal, comprising:

a processor; and a memory storing at least one instruction executable by the processor, wherein the processor is configured to:

receive indication information sent by a base station, wherein the indication information is configured to indicate a standby bandwidth part (BWP) to be used when a BWP switching failure occurs, and the BWP indicated by the indication information is any of a BWP at which the terminal works currently, a BWP at which the terminal works previously, and a preset BWP;

switch to the BWP indicated by the indication information when detecting that the BWP switching failure occurs;

receive control information corresponding to the terminal, the control information being sent by the base station at the BWP indicated by the indication information; and send a BWP switching failure notification to the base station.

17. A base station, comprising:

a processor; and a memory storing at least one instruction, wherein the processor is configured to implement the method for acquiring control information according to claim 11.

* * * * *